United States Patent
Honjo et al.

(10) Patent No.: US 7,521,032 B2
(45) Date of Patent: Apr. 21, 2009

(54) METHOD FOR REMOVING MERCURY IN EXHAUST GAS

(75) Inventors: Shintaro Honjo, Hiroshima (JP); Kozo Iida, Hiroshima (JP); Susumu Okino, Hiroshima (JP); Kazuto Kobayashi, Hiroshima (JP); Kenichi Okada, Hiroshima (JP); Naoyuki Kamiyama, Hiroshima (JP); Shigeru Nojima, Hiroshima (JP); Yasuhiro Takeuchi, Tokyo (JP); Tsuyoshi Ohishi, Tokyo (JP)

(73) Assignee: Mitsubishi Heavy Industries, Ltd. (JP)

( * ) Notice: Subject to any disclaimer, the term of this patent is extended or adjusted under 35 U.S.C. 154(b) by 765 days.

(21) Appl. No.: 10/767,783

(22) Filed: Jan. 29, 2004

(65) Prior Publication Data

US 2004/0253158 A1  Dec. 16, 2004

(30) Foreign Application Priority Data

Feb. 7, 2003  (JP) .............................. 2003-031189

(51) Int. Cl.
  *B01D 53/52*  (2006.01)
(52) U.S. Cl. ..................... 423/210; 423/235; 423/242.1
(58) Field of Classification Search ................. 423/235, 423/242.1, 210

See application file for complete search history.

(56) References Cited

U.S. PATENT DOCUMENTS 6,638,485 B1  10/2003  Iida et al.

FOREIGN PATENT DOCUMENTS

JP  10-230137  9/1998

*Primary Examiner*—Edward M Johnson
(74) *Attorney, Agent, or Firm*—Lerner, David Littenberg, Krumholz & Mentlik, LLP (57) ABSTRACT

The present invention provides a system for removing mercury in exhaust gas, in which mercury is removed from exhaust gas of a boiler, characterized in that between a denitrification apparatus and a wet type desulfurization apparatus, an $NH_3$ decomposition catalyst and a mercury oxidation catalyst are provided, and mercury having been oxidized into mercury chloride is removed by the wet type desulfurization apparatus. Also, it provides a method for removing mercury in exhaust gas, characterized in that the mercury removing method includes an $NH_3$ decomposition process and a mercury oxidation process, which are provided between the denitrification process and a wet desulfurization process, and mercury having been oxidized into mercury chloride is removed in the wet desulfurization process.

11 Claims, 4 Drawing Sheets

METHOD FOR REMOVING MERCURY IN EXHAUST GAS

TECHNICAL FIELD

The present invention relates to a mercury removing method for removing mercury from exhaust gas of a boiler and a mercury removing system therefor. More particularly, it relates to a mercury removing method suitable for removing mercury contained in exhaust gas with a low Cl content discharged from a coal-fired boiler or the like and a system for implementing the said method.

BACKGROUND ART

Conventionally, it has been thought that mercury exists in exhaust gas in forms of metallic mercury insoluble in water and mercury chloride soluble in water. If metallic mercury can be converted to mercury chloride in the presence of a catalyst such as a denitrification catalyst, mercury can be removed by a desulfurization apparatus on the downstream side (for example, see Japanese Patent Provisional Publication No. 10-230137 (No. 230137/1998)).

However, when mercury is converted to mercury chloride by using the denitrification catalyst, the conversion temperature is limited to 300 to 450°, so that in the case of coal with a low Cl content, it is necessary to supply HCl into exhaust gas to maintain the rate of conversion to mercury chloride, which presents problems of increased utility cost and occurrence of material corrosion.

On the other hand, a method can be thought of in which a mercury oxidation catalyst is provided separately from the denitrification catalyst so that the conversion can be accomplished at a low temperature, and thereby metallic mercury is converted to mercury chloride in the presence of mercury oxidation catalyst.

However, when metallic mercury is converted to mercury chloride by using a mercury oxidation catalyst at a low temperature, excess $NH_3$ having been injected in an upstream denitrification apparatus flows down and adheres onto the catalyst as ammonium sulfate or acid ammonium sulfate, by which the catalyst performance is sometimes deteriorated greatly. Also, there arises a problem in that the catalyst itself is closed by the adherend. Specifically, in an ammonia denitrification apparatus applied to a combustion boiler, ammonia ($NH_3$) is injected through an injection nozzle in the combustion boiler or on the downstream side thereof to be allowed to react reductively with nitrogen oxides (NO, $NO_2$), by which a process for decomposing nitrogen oxides into nitrogen ($N_2$) and water ($H_2O$) is carried out. Ammonia added excessively in this process exists in the exhaust gas and flows down to the downstream side of the denitrification catalyst, and thereby produces ammonium sulfate or acid ammonium sulfate.

On the other hand, even when either of the denitrification or mercury oxidation catalysts is used, the coexistence of $NH_3$ hinders a mercury oxidation reaction and hence causes an increase in the filling amount of catalyst.

DISCLOSURE OF THE INVENTION

In view of the above problems, the inventors conducted studies earnestly to develop a method for removing mercury in exhaust gas, in which even if $NH_3$ leaks to the downstream side of the denitrification apparatus, hindrance to reaction due to $NH_3$ in mercury oxidation treatment can be avoided and the amount of catalyst can be decreased by enhanced catalyst durability, and adhesion of ammonium sulfate to heating means such as an air heater and a heat exchanger such as a GGH can be prevented.

As a result, the inventors found that the above-described problems can be solved by combining an $NH_3$ decomposition catalyst for decomposing $NH_3$ flowing down from the outlet of the denitrification apparatus with a mercury oxidation catalyst for oxidizing mercury into mercury chloride, which is provided on the downstream side of the $NH_3$ decomposition catalyst. The present invention was completed from this point of view.

Accordingly, an object of the present invention is to provide a system for removing mercury in exhaust gas, in which mercury is removed from exhaust gas of a coal-fired boiler, wherein between a denitrification apparatus and a wet type desulfurization apparatus, an $NH_3$ decomposition catalyst for decomposing $NH_3$ flowing down from the outlet of the denitrification apparatus and a mercury oxidation catalyst for oxidizing mercury into mercury chloride on the downstream side of the $NH_3$ decomposition catalyst are provided, and mercury having been oxidized into mercury chloride is removed by the wet type desulfurization apparatus.

In the present invention, a mode can preferably be cited in which in the mercury removing system in which heating means and a heat exchanger are provided between the denitrification apparatus and wet type desulfurization apparatus, the mercury oxidation catalyst is installed at least at one location of: between the downstream side of the $NH_3$ decomposition catalyst and the upstream of the heating means; between the downstream side of the heating means and the upstream of the heat exchanger; and between the. downstream side of the heat exchanger and the upstream side of the wet type desulfurization apparatus. It is preferable that the mercury oxidation catalyst be a catalyst in which at least one kind selected from the group consisting of $TiO_2$, $SiO_2$, $ZrO_2$, $Al_2O_3$ and zeolite is used as a carrier, and at least one kind selected from the group consisting of Pt, Ru, Rh, Pd, Ir, V, W, Mo, Ni, Co, Fe, Cr, Cu and Mn is carried on the carrier as an active component. Also, it is preferable that the $NH_3$ decomposition catalyst be a catalyst in which at least one kind selected from the group consisting of $TiO_2$, $SiO_2$, $ZrO_2$, $Al_2O_3$ and zeolite is used as a carrier, and at least one kind selected from the group consisting of Pt, Ru, Rh, Pd, Ir, V, W, Mo, Ni, Co, Fe, Cr, Cu and Mn is carried on the carrier as an active component.

Also, another object of the present invention is to provide a method for removing mercury in exhaust gas, in which mercury is removed from exhaust gas of a coal-fired boiler, wherein the mercury removing method includes an $NH_3$ decomposition process for decomposing $NH_3$ flowing down from a denitrification process and a mercury oxidation process for oxidizing mercury into mercury chloride on the downstream side of the $NH_3$ decomposition process, which are provided between the denitrification process and a wet desulfurization process, and mercury having been oxidized into mercury chloride is removed in the wet desulfurization process.

In the present invention, a mode can preferably be cited in which in the mercury removing method including a heating process and a heat recovery process, which are provided between the denitrification process and wet desulfurization process, the $NH_3$ decomposition process is carried out in a temperature zone of 300 to 450° C. on the downstream side of the denitrification process, and the mercury oxidation process is carried out at least in one location of: a temperature zone of 300 to 450° C. on the downstream side of the $NH_3$ decomposition process; a temperature zone of 120 to 200° C. on the downstream side of the heating process; or a temperature zone of 60 to 120° C. on the downstream side of the heat recovery process. When the mercury oxidation process is carried out on the downstream side of the heating process, the temperature can be controlled to a predetermined temperature in the range of 60 to 200° C. Also, the temperature in the mercury oxidation process can be controlled by measuring the concentration of metallic mercury or mercury chloride in an oxidation catalyst outlet gas in the mercury oxidation process. Further, it is preferable that in the $NH_3$ decomposition process, $NH_3$ be treated so that the concentration of $NH_3$ at the outlet is 1 ppm or lower, preferably 0.1 ppm or lower, and then mercury be oxidized in the mercury oxidation process.

According to the present invention, after $NH_3$ leaking to the downstream side of the denitrification catalyst has been decomposed, mercury is oxidized, by which the hindrance to reaction due to $NH_3$ can be avoided, and the amount of catalyst can be decreased by the increase in catalyst performance. Also, when the mercury oxidation catalyst is installed in a temperature zone behind the heating means such as the air heater, ammonium sulfate can be prevented from adhering, so that the amount of catalyst can be decreased by enhanced durability.

Also, by decomposing $NH_3$ leaking to the downstream side of the denitrification catalyst, ammonium sulfate can be prevented from adhering to the heating means such as the air heater or the heat exchanger such as the GGH, and further the durability of system can be enhanced by the decrease in frequency of soot blow.

Hereunder, an embodiment of the present invention will be described in detail, but the scope of the present invention is not limited by this embodiment.

In the above figures, reference numeral 1 denotes a boiler, 2 denotes a denitrification apparatus, 3 and 11 each denote an $NH_3$ decomposition catalyst, 4 denotes an air heater (A/H), 5 denotes a dust collector, 6 denotes heat recovery side heat exchanger (GGH), 7 denotes a desulfurization absorption tower (wet type desulfurization apparatus), 8 denotes a reheating side heat exchanger (GGH), 9 denotes a stack, 10 and 12 each denote a mercury oxidation catalyst, 13 denotes a reactor, 14 denotes an electric heater, 15 denotes a cooler, and 16 and 17 each denote a reactor.

BEST MODE FOR CARRYING OUT THE INVENTION

Method for Removing Mercury in Exhaust Gas

In a method for removing mercury in exhaust gas in accordance with the present invention, exhaust gas discharged from a coal-fired boiler is sent to a denitrification catalyst, and a denitrification process is carried out. In the denitrification process, ammonia ($NH_3$) is added as a reducing agent on the upstream side of the denitrification catalyst. Therefore, added excess $NH_3$ is contained in large amounts in the exhaust gas having been subjected to denitrification treatment. This $NH_3$ hinders mercury oxidation reaction (mercury oxidation process) on the downstream side, and also adheres onto a catalyst as ammonium sulfate or acid ammonium sulfate when a low-temperature mercury oxidation catalyst is used. Therefore, the catalyst performance is deteriorated greatly, and the adherend may close the catalyst.

For this reason, in the present invention, $NH_3$ that hinders the mercury oxidation reaction (mercury oxidation process) is removed from exhaust gas flowing down from the denitrification process on the upstream side of the mercury oxidation catalyst. For this purpose, an $NH_3$ decomposition catalyst is installed just behind the denitrification catalyst. Excess $NH_3$ having been sent from the denitrification catalyst to the downstream side is decomposed on the $NH_3$ decomposition catalyst, and is removed from the exhaust gas.

Next, in the present invention, mercury is removed from the exhaust gas from which $NH_3$ has been removed through the $NH_3$ decomposition process. For this purpose, first, mercury in the exhaust gas is subjected to oxidation reaction with hydrogen chloride contained in large amounts in the exhaust gas in the presence of the mercury oxidation catalyst in a mercury oxidation process, by which mercury is converted to mercury chloride. Then, the exhaust gas containing mercury chloride is caused to pass through a downstream wet type desulfurization apparatus, by which mercury components in the exhaust gas are absorbed by an alkali absorbing solution used in a wet type desulfurization process and are removed.

Between the above-described denitrification process and wet type desulfurization process, a heating process using a heater or steam and a heat recovery process using a gas heater are included. In such a system, the $NH_3$ decomposition process is carried out in a temperature zone of 300 to 450° C. on the downstream side of the denitrification process. The mercury oxidation process is carried out in any temperature zone of a temperature zone of 300 to 450° C. on the downstream side of the $NH_3$ decomposition process, a temperature zone of 120 to 200° C. on the downstream side of the heating process, and a temperature zone of 60 to 120° C. on the downstream side of the heat recovery process.

When the mercury oxidation process is carried out on the downstream side of the heating process, the temperature is preferably controlled to a predetermined temperature in the range of 60 to 200° C. Also, the temperature in the mercury oxidation process can be controlled by measuring the concentration of metallic mercury or mercury chloride in an oxidation catalyst outlet gas in the mercury oxidation process. Further, it is preferable that in the $NH_3$ decomposition process, $NH_3$ be treated so that the concentration of $NH_3$ at the outlet is usually 1 ppm or lower, preferably 0.1 ppm or lower, and then mercury be oxidized in the mercury oxidation process.

System for Removing Mercury in Exhaust Gas

Figure 1:
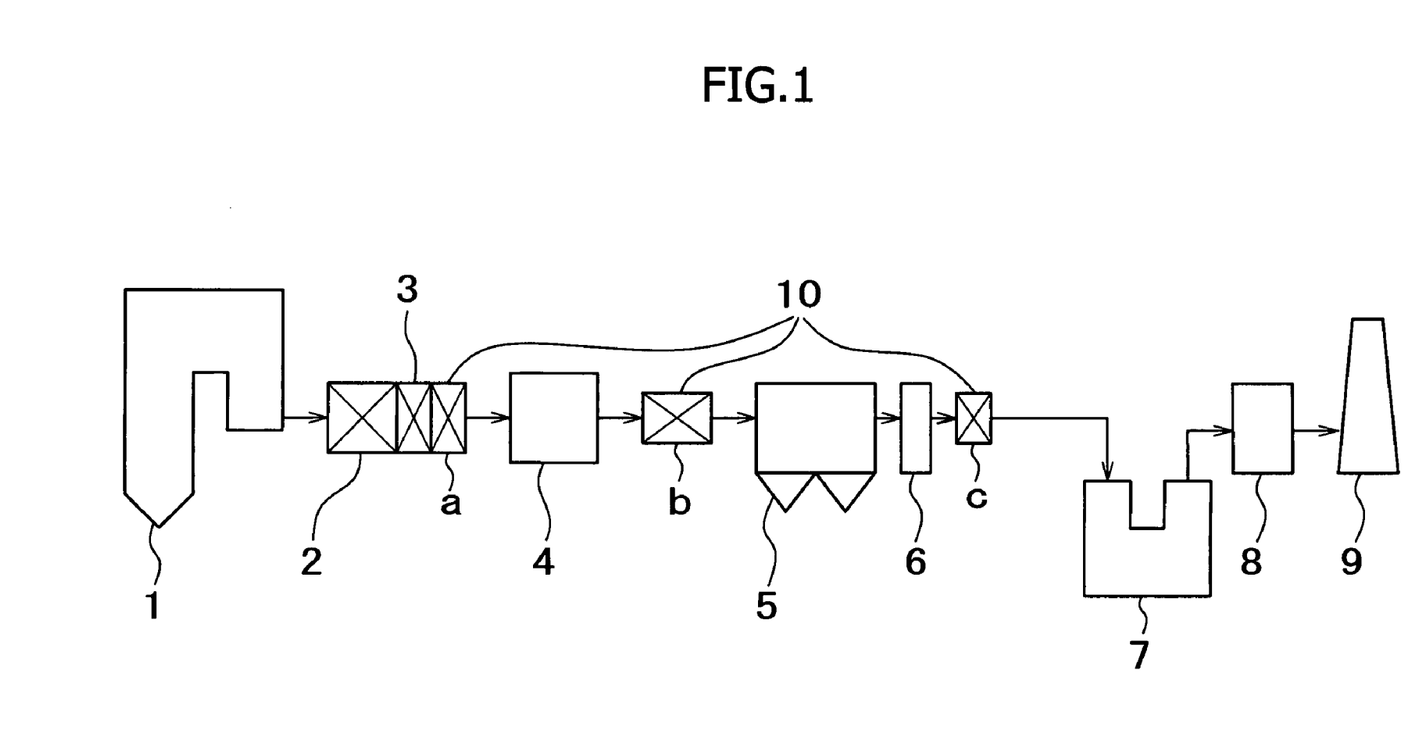
FIG. 1 is a schematic view showing one example of a system for removing mercury in exhaust gas in accordance with the present invention.

FIG. 1 shows one example of a system using the above-described method. A specific embodiment of the mercury removing system in accordance with the present invention will now be described in detail with reference to the accompanying drawings.

In the present invention, exhaust gas of a coal-fired boiler, which contains mercury (Hg), is caused to pass through the $NH_3$ decomposition catalyst, and then metallic mercury is oxidized into mercury chloride in the presence of the mercury oxidation catalyst. After metallic mercury is converted to water-soluble mercury chloride by the mercury oxidation catalyst on the upstream side of the wet type desulfurization apparatus, the exhaust gas is introduced into the desulfurization absorption tower, where desulfurization is accomplished by the alkali absorbing solution of the wet type desulfurization apparatus on the downstream side. By this treatment, SOx is absorbed and removed by bringing the exhaust gas into contact with the absorbing solution such as a lime slurry circulating solution in the desulfurization absorption tower within the system. At the same time, mercury chloride ($HgCl_2$) is dissolved in the absorbing solution and is removed.

In the system shown in FIG. 1, on the downstream side of a boiler 1, a denitrification apparatus (SCR) 2, an $NH_3$ decomposition catalyst 3, an air heater (A/H) 4, which is heating means, a dust collector 5, a heat exchanger (GGH) 6 for recovering heat energy, a desulfurization absorption tower (wet type desulfurization apparatus) 7, a heat exchanger (GGH) 8 for reheating, and a stack 9 are arranged in that order. A mercury oxidation catalyst 10 is installed at any one location of: between the downstream side of the $NH_3$ decomposition catalyst 3 and the upstream side of the air heater (A/H) 4; between the downstream side of the air heater (A/H) 4 and the upstream side of the dust collector 5; and between the downstream side of the heat exchanger (GGH) 6 and on the upstream side of the desulfurization absorption tower (wet type desulfurization apparatus) 7.

In one example of the denitrification apparatus 2 used in this system, reducing agent injecting means is provided on the exhaust gas inflow side of the denitrification catalyst. As the reducing agent injecting means, means that is made up of a reducing agent injection pipe and a plurality of spray nozzles is used. As a method for injecting a reducing agent including ammonia, there is available, for example, a method in which a reducing agent is vaporized, and is diluted by adding air, inert gas, water vapor, etc. to the vaporized reducing agent before injection is accomplished. At this time, it is effective to arrange the nozzles so that the reducing agent flows uniformly in the catalyst layer, and in some cases, the nozzles are arranged in the direction perpendicular to the gas flow. Also, as the denitrification catalyst layer, a honeycomb-shaped catalyst, a catalyst layer formed by lapping the honeycomb-shaped catalysts, a catalyst layer formed by packing granular catalysts, or the like is used.

As the denitrification catalyst, a catalyst in which an active metal of at least one kind selected from a group consisting of V, W and Mo is contained in a carrier of $TiO_2$ or $TiO_2+SiO_2$ composite oxide can be used. Also, a catalyst in which an active metal of at least one kind selected from a group consisting of Pt, Pd, Ir, Ru, Cu, Co, Fe, Ag, Mn, Ni, Zn and In is contained in a carrier of at least one kind selected from a group consisting of $Al_2O_3$, $SiO_2$, $ZrO_2$, $TiO_2$, metallosilicate, and zeolite can be used.

As the active metal, noble metals of Pt, Pd, Ru, Ir, etc. are preferable. In particular, Pt-based metals are preferable. Also, as the carrier, metallosilicate, ZSM5, silicalite, Y-type zeolite, mordenite, alumina, silica, titania, etc. can be used preferably. Although the shape of catalyst is not subject to any special restriction, a honeycomb shape is preferable. The necessary amount of catalyst is usually in the range of 1000 to 50,000 $h^{-1}$ in terms of GHSV.

On the downstream side of the denitrification apparatus (SCR), the $NH_3$ decomposition catalyst 3 is provided.

As the $NH_3$ decomposition catalyst 3 used in the present invention, a catalyst in which at least one kind selected from a group consisting of $TiO_2$, $SiO_2$, $ZrO_2$, $Al_2O_3$ and zeolite is used as a carrier, and at least one kind selected from a group consisting of Pt, Ru, Rh, Pd, Ir, V, W, Mo, Ni, Co, Fe, Cr, Cu and Mn is carried on the carrier as an active component can be cited. From the viewpoint of durability against sulfur oxides contained in exhaust gas, as the carrier, in particular, titanium oxides or silicon oxides are preferably used, and a catalyst in which a composite oxide containing $TiO_2$ or $SiO_2$ is used as a carrier and an oxide of vanadium, tungsten, molybdenum, or the like is carried as active metal species has a high activity.

In this embodiment, the mercury oxidation catalyst 10a, 10b or 10c is installed at one location of any of: between the downstream side of the $NH_3$ decomposition catalyst 3 and the upstream side of the air heater 4 (10a) (temperature zone of 300 to 450° C.); between the downstream side of the air heater 4 and the upstream side of the dust collector 5 (10b) (temperature zone of 120 to 200° C.); or between the downstream side of the heat recovering heat exchanger 6 and the upstream side of the wet type desulfurization apparatus 7 (10c) (temperature zone of 60 to 120° C.).

As the mercury oxidation catalyst 10 used in the present invention, a catalyst in which at least one kind selected from a group consisting of $TiO_2$, $SiO_2$, $ZrO_2$, $Al_2O_3$ and zeolite is used as a carrier, and at least one kind selected from a group consisting of Pt, Ru, Rh, Pd, Ir, V, W, Mo, Ni, Co, Fe, Cr, Cu and Mn is carried on the carrier as an active component can be cited. Like the $NH_3$ decomposition catalyst 3, from the viewpoint of durability against sulfur oxides contained in exhaust gas, as the carrier, in particular, titanium oxides or silicon oxides or composite oxides thereof are preferably used, and a catalyst in which a composite oxide containing $TiO_2$ or $SiO_2$ is used as a carrier and an oxide of vanadium, tungsten, molybdenum, or the like is carried as active metal species has a high activity.

In the present invention, in order to increase the specific surface area and solid acid amount of catalysts 3 and 10, Ti oxides that are rendered a composite oxide can be used as the carrier. As a metal forming the composite oxide of Ti, for example, silicon (Si), zirconium (Zr), aluminum (Al), and tungsten (W) can be cited. For example, composite oxides of Ti and Si, Ti and Zr, Ti and Al, Ti and W, etc. can be used. Because none of these composite oxides form a sulfate easily, they can maintain a stable structure, so that the specific surface area and solid acid amount can be increased. Also, as necessary, a composite oxide of three-component system such as Ti and Si+Zr, Ti and Si+W, Ti and Si+Al, Ti and Zr+Al, and Ti and Zr+W can be used.

In the catalysts 3 and 10 of the present invention, at least one kind selected from a group consisting of Pt, Ru, Rh, Pd, Ir, V, W, Mo, Ni, Co, Fe, Cr, Cu and Mn is used as an active component by being carried on the above-described carrier. Any of these catalysts has oxidation capability, and thus can oxidize metallic mercury into mercury chloride when it is used as the mercury oxidation catalyst 10.

The composition ratio of catalyst used in the present invention is not subject to any special restriction. As one example, with respect to 100 parts by weight of a carrier consisting of one kind of an oxide or a composite oxide, for an active component of a base metal element such as V, W, Mo, Ni, Co, Fe, Cr, Cu and Mn, a composition of 0.5 to 20 parts by weight as an oxide thereof can preferably be cited, and for an active component of a noble metal element such as Pt, Ru, Rh, Pd, and Ir, a composition of 0.01 to 1 part by weight as a metal thereof can preferably be cited. More specifically, in the case of the mercury oxidation catalyst 10, with respect to 100 parts by weight of $TiO_2$—$SiO_2$ composite oxide carrier, a composition with an active component of 1.2 parts by weight of vanadium pentoxide and 9 parts by weight of tungsten oxide ($WO_3$), a composition of 0.05 part by weight of Pt and 9 parts by weight of tungsten oxide ($WO_3$), and the like compositions can be cited. Also, in the case of the $NH_3$ decomposition catalyst 3, with respect to 100 parts by weight of $TiO_2$ carrier, a composition with an active component of 4 to 10 parts by weight of vanadium pentoxide, a composition of 0.5 part by weight of Pt, 0.6 part by weight of vanadium pentoxide, and 9 parts by weight of tungsten oxide ($WO_3$), and the like compositions can be cited.

Also, for the above-described catalysts used in the present invention, an arbitrary shape can be selected according to the system configuration. Any integrally molded shape such as a pellet shape, plate shape, cylindrical shape, corrugated shape, or honeycomb shape can be used.

In this system shown in FIG. 1, on the downstream side of the $NH_3$ decomposition catalyst 3, the air heater (A/H) 4, which is heating means, and the dust collector 5 are provided. The dust collector 5 is not subject to any special restriction, and may be of any type that can collect dust roughly before exhaust gas is introduced into the desulfurization absorption tower 7. On the downstream side of the dust collector 5, the heat exchanger (GGH) 6 for recovering heat energy is provided, and successively the desulfurization absorption tower (wet type desulfurization apparatus) 7 is provided. The desulfurization absorption tower 7 is not subject to any special restriction, and a wet type desulfurization apparatus that is generally used for flue gas treatment or a desulfurization apparatus in which a cooling tower is provided on the upstream side of an absorption tower can be used. As the absorbing solution used for wet desulfurization, an aqueous solution (alkali absorbing solution) of an absorbent such as calcium carbonate, calcium oxide, calcium hydroxide, sodium carbonate, and sodium hydroxide can be cited.

In this system using the wet desulfurization method, on the downstream side of the desulfurization absorption tower 7, the heat exchanger 8 for reheating is provided, and exhaust gas is discharged to the air from the stack 9 after passing through these apparatuses. In the heat exchanger 8 for reheating, combustion exhaust gas whose temperature has been decreased is heated by heat energy recovered by the heat exchanger 6 for recovering heat provided on the upstream side of the desulfurization absorption tower 7. When combustion exhaust gas is discharged, the gas after being purified is heated and turned to a high-temperature gas, and the high-temperature gas is discharged. For this purpose, the heat exchanger 8 for supplying heat is provided on the downstream side of the wet type desulfurization apparatus 7.

The heat exchanger 6 for recovering heat and the heat exchanger 8 for reheating each are formed by a gas heater of a system in which heat energy is exchanged with a heat medium being used as a medium. The heat exchangers 6 and 8 may be of a type in which the exhaust gas is cooled and heated, respectively, and may be a separate system or a gas-gas heater in which heat exchange is accomplished directly.

In the above-described system shown in FIG. 1, metallic mercury is removed as described below.

In the exhaust gas from the boiler 1, a Cl content in fuel such as coal exists as HCl, and metallic mercury (Hg) is oxidized into mercury chloride ($HgCl_2$) on the mercury oxidation catalyst 10. In the desulfurization absorption tower 7, $SO_2$ in the exhaust gas is removed, and at the same time $HgCl_2$ is removed. Since the concentration of HCl in the exhaust gas is overwhelmingly higher than the concentration of Hg, excess HCl is contained. However, the excess HCl is absorbed by the alkali aqueous solution such as milk of lime in the desulfurization absorption tower 7, so that it is not discharged from the stack. The exhaust gas from which Hg has been removed in the desulfurization absorption tower 7 is introduced into the heat exchanger 8 for reheating, being heated by heat energy recovered by the heat exchanger 6, and is discharged from the stack 9.

As described above, in the present invention, mercury is oxidized in the presence of the mercury oxidation catalyst, and mercury in the exhaust gas, which has been converted to water-soluble mercury chloride, is removed in the wet desulfurization process. On the other hand, the optimum temperature for oxidation of mercury changes according to the Cl content in fuel, so that a too high or too low temperature may cause metallic mercury to be discharged without being sufficiently oxidized.

To avoid this problem, in this embodiment, the mercury oxidation catalyst 10 is installed at any one location of: between the downstream side of the $NH_3$ decomposition catalyst 3 and the upstream side of the air heater 4 (10a) (temperature zone of 300 to 450° C.); between the downstream side of the air heater 4 and the upstream side of the dust collector 5 (10b) (temperature zone of 120 to 200° C.); or between the downstream side of the heat recovering heat exchanger 6 and the upstream side of the wet type desulfurization apparatus 7 (10c) (temperature zone of 60 to 120° C.)

Figure 2:
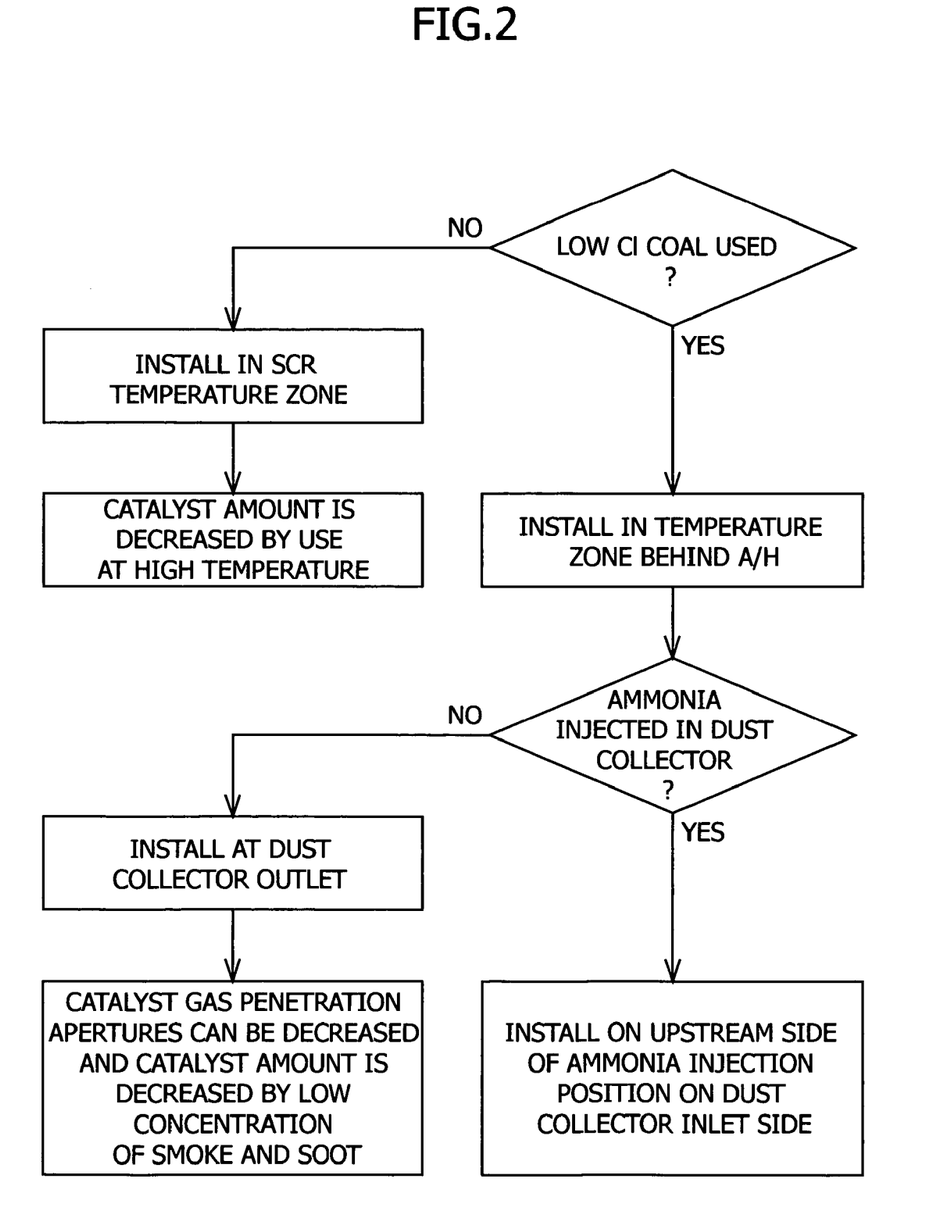
FIG. 2 is a flowchart showing a procedure flow for studying the installation location of a mercury oxidation catalyst in the mercury removing system in accordance with the present invention.

FIG. 2 is a flowchart showing a procedure for studying the installation location of the mercury oxidation catalyst.

The exhaust gas to be treated in the present invention is a boiler exhaust gas of a thermal electric power station, factory, etc. in which fuel containing sulfur and mercury, such as coal or heavy oil, is burned, or a heating furnace exhaust gas of a metal factory, refinery, petrochemical plant, etc., so that it contains carbon dioxide, oxygen, SOx, smoke and soot, and water, and has a large discharge amount. The following is a description of a preferred mode for treating the exhaust gas of coal-fired boiler.

Firstly, when coal of medium- and high-concentration (not lower than 0.01%) Cl is used, with coal of low-concentration (not higher than 0.01%) Cl not being used, the mercury oxidation catalyst 10 is installed in the temperature zone of the denitrification catalyst 2 on the downstream side of the $NH_3$ decomposition catalyst 3 and on the upstream side of the air heater 4 (10a) (temperature zone of 300 to 450° C.). In this mode, since the mercury oxidation catalyst 10 is used at a high temperature, the amount of catalyst can be decreased.

Secondly, when coal of low-concentration Cl is used, the mercury oxidation catalyst 10 is installed in a temperature zone of 60 to 200° C. on the downstream side of the heating process using the air heater 4 or the like. The installation location is changed depending on whether or not a system in which ammonia is injected is used in the dust collector 5. The reason for this is that if ammonia is injected into the exhaust gas, the concentration of ammonia in the exhaust gas, which has been decreased by the $NH_3$ decomposition catalyst, increases again, which hinders the mercury oxidation reaction caused by the mercury oxidation catalyst 10, and hence decreases the efficiency of conversion to mercury chloride.

Therefore, in the system in which ammonia is injected in the dust collector 5, the mercury oxidation catalyst 10 is installed at a location on the upstream side of the dust collector 5 and on the downstream side of the air heater 4 (10b) (temperature zone of 120 to 200° C.), where ammonia is not injected into the exhaust gas.

On the other hand, in the system in which ammonia is not injected in the dust collector 5, the mercury oxidation catalyst 10 is installed at a location which is on the downstream side of the dust collector 5, on the downstream side of the heat recovering heat exchanger 6, and on the upstream side of the wet type desulfurization apparatus 7 (10c) (temperature zone of 60 to 120° C.). In this mode, since ammonia is not injected, the catalyst can be installed either before or behind the dust collector 5. However, on the downstream side of the dust collector 5, smoke and soot in the exhaust gas have been removed, so that gas penetration apertures of catalyst can be decreased, which achieves the effect of being able to decrease the amount of catalyst.

For the mercury oxidation catalyst for exhaust gas shown in FIG. 1, by installing the mercury oxidation catalyst at the optimum location which has each temperature zone in accordance with the flow shown in FIG. 2, the metallic mercury in combustion exhaust gas can effectively be oxidized into mercury chloride capable of being absorbed and removed by the desulfurization absorption tower 7.

Also, according to this system, by measuring the concentration of metallic mercury or mercury chloride in the gas at the outlet of the mercury oxidation catalyst 10, the mercury oxidation process is controlled so as to have a proper temperature. Thereby, even without adding a chlorinating agent (HCl etc.), metallic mercury can be oxidized into mercury chloride stably according to the Cl content in the exhaust gas, so that the metallic mercury in the exhaust gas can be removed effectively.

As described above, according to the system of the present invention, after $NH_3$ leaking to the downstream side of the denitrification catalyst has been decomposed, mercury is oxidized, by which the hindrance to reaction due to $NH_3$ can be avoided, and the amount of catalyst can be decreased by the increase in catalyst performance. Also, when the mercury oxidation catalyst is installed in a temperature zone behind the heating means such as the air heater, ammonium sulfate can be prevented from adhering, so that the amount of catalyst can be decreased by enhanced durability.

Also, by decomposing $NH_3$ leaking to the downstream side of the denitrification catalyst, ammonium sulfate can be prevented from adhering to the heating means such as the air heater or the heat exchanger such as a GGH, and further the durability of system can be enhanced by the decrease in frequency of soot blow.

The following experiments were conducted to verify the effect of removing mercury in the present invention, but the present invention is not restricted by the description of these examples.

EXAMPLES

Example 1

Figure 3:
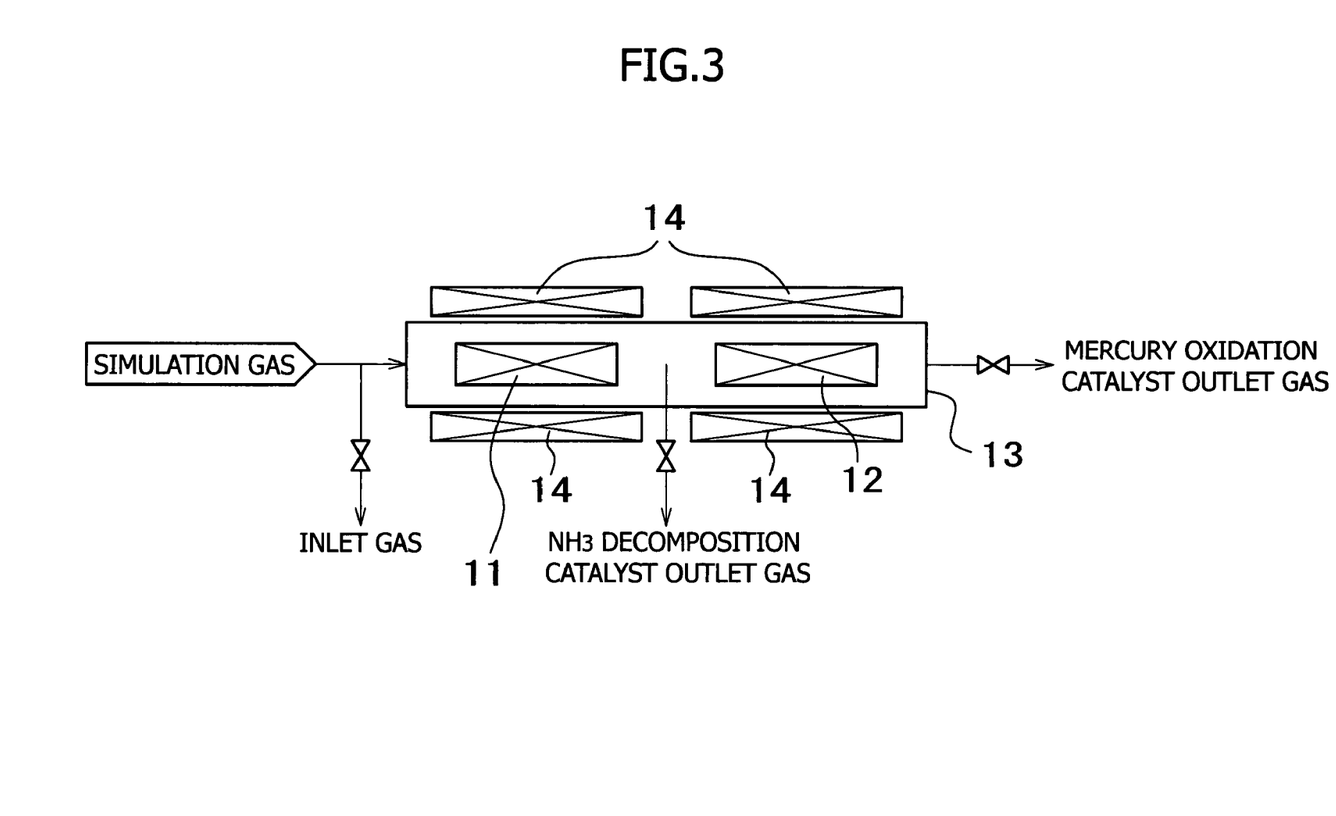
FIG. 3 is a schematic explanatory view of an apparatus for removing mercury in exhaust gas which is used in example 1.

A test was carried out to evaluate the oxidation rate of mercury and the decomposition rate of ammonia by using an apparatus for removing mercury in exhaust gas which is shown in FIG. 3.

In the apparatus of this example 1, $H_2O$, $CO_2$, $O_2$, $NH_3$ and HCl were added to $N_2$ gas, and the vapor of metallic mercury was mixed to prepare a simulation gas. The simulation gas was introduced into a reactor 13, and was allowed to pass through an $NH_3$ decomposition catalyst 11 and a mercury oxidation catalyst 12 provided in the reactor 13. For the catalysts, the temperature thereof was controlled by an electric heater 14. An inlet gas, an outlet gas of the $NH_3$ decomposition catalyst 11, and an outlet gas of the mercury oxidation catalyst 12 were sampled.

The test conditions were as described below: the content of added gases were $H_2O$: 7%, $CO_2$: 12%, $O_2$: 5%, $NH_3$: 10 ppm, and HCl: 10 ppm, the mercury concentration was Hg: 30 µg/m³N, the reactor temperature was 350° C. at ordinary pressure, the $NH_3$ decomposition catalyst SV was 6000 h⁻¹, the mercury oxidation catalyst SV was 6000 h⁻¹, the $NH_3$ decomposition catalyst was $V_2O_5/TiO_2$—$SiO_2$, and the mercury oxidation catalyst was $V_2O_5$—$WO_3/TiO_2$—$SiO_2$. Table 1 gives the test results.

TABLE 1

| Catalyst No. | Inlet | $NH_3$ decomposition catalyst outlet | Mercury oxidation catalyst outlet |
|---|---|---|---|
| ToHg concentration (µg/m³N) | 30 | 30 | 30 |
| $HgCl_2$ concentration (µg/m³N) | 0.5 | 5.2 | 28.8 |
| HCl concentration (ppm) | 10 | — | — |
| $NH_3$ concentration (ppm) | 10 | <0.1 | <0.1 |
| $NH_3$ decomposition rate (%) | — | >99.9 | — |
| Hg oxidation rate (%) | — | 15.9 | 95.2 |

From the test results given in Table 1, it was found that by decomposing 99% or more of ammonia by the $NH_3$ decomposition catalyst, 95% or more of metallic mercury in the gas can be oxidized, and can be removed by the downstream wet type desulfurization apparatus.

By this example, it was made clear that in the above-described embodiment, when the mercury oxidation catalyst 10 is installed just behind the $NH_3$ decomposition catalyst 3 and on the upstream side of the air heater 4 (10a) (temperature zone of 300 to 450° C.), mercury oxidation reaction proceeds sufficiently.

Example 2

Figure 4:
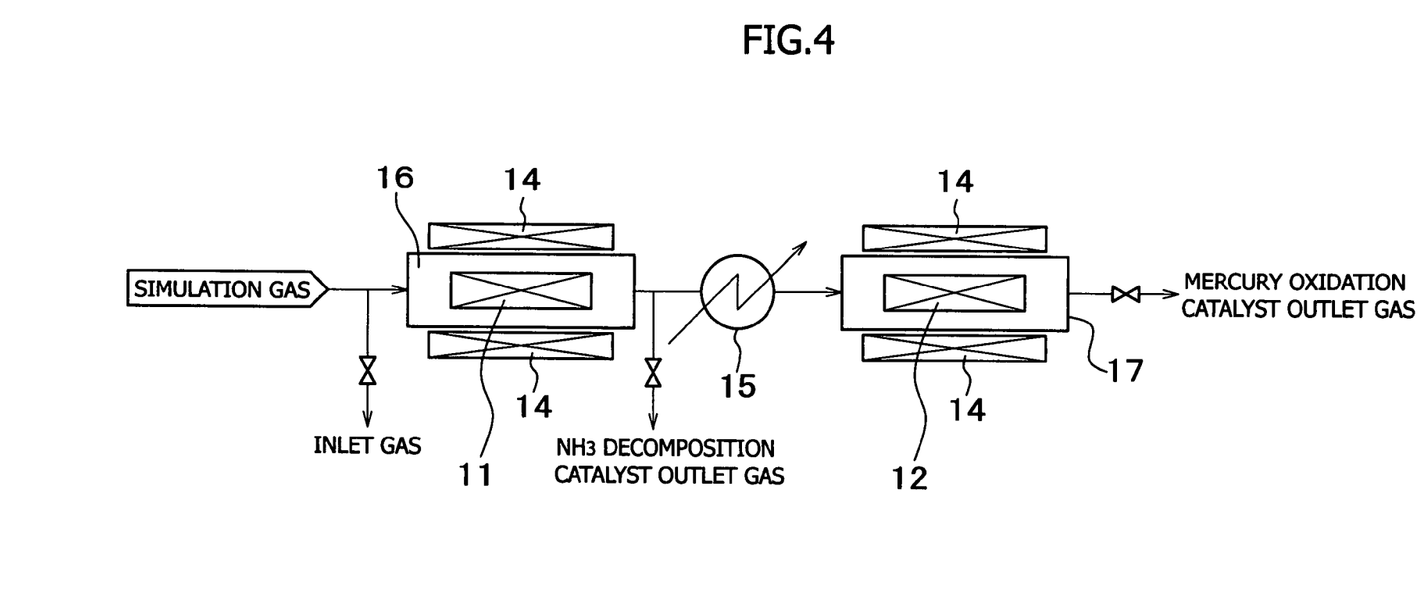
FIG. 4 is a schematic explanatory view of an apparatus for removing mercury in exhaust gas which is used in example 2.

A test was carried out to evaluate the oxidation rate of mercury and the decomposition rate of ammonia by using an apparatus for removing mercury in exhaust gas which is shown in FIG. 4.

In the apparatus of this example 2 as well, $H_2O$, $CO_2$, $O_2$, $NH_3$ and HCl were added to $N_2$ gas, and the vapor of metallic mercury was mixed to prepare a simulation gas. The simulation gas was first introduced into a reactor 16, and was allowed to pass through the $NH_3$ decomposition catalyst 11 provided in the reactor 16, and the temperature of the catalyst was controlled by the electric heater 14. The gas coming out of the reactor 16 passed through a cooler 15, and then was introduced into a next reactor 17. The gas was allowed to pass through the mercury oxidation catalyst 12 provided in the reactor 17, and the temperature of the catalyst was controlled by the electric heater 14. An inlet gas, an outlet gas of the $NH_3$ decomposition catalyst 11, and an outlet gas of the mercury oxidation catalyst 12 were sampled.

The test conditions were as described below: the content of added gases were $H_2O$: 7%, $CO_2$: 12%, $O_2$: 5%, $NH_3$: 10 ppm, and HCl: 10 ppm, the mercury concentration was Hg: 30 µg/m³N, the temperature of $NH_3$ decomposition catalyst was 350° C. and that of mercury oxidation catalyst was 160° C. at ordinary pressure, the $NH_3$ decomposition catalyst SV was 6000 h⁻¹, the mercury oxidation catalyst SV was 6000 h⁻¹, the $NH_3$ decomposition catalyst was $V_2O_5/TiO_2$—$SiO_2$, and the mercury oxidation catalyst was $V_2O_5$—$WO_3/TiO_2$—$SiO_2$. Table 2 gives the test results.

TABLE 2

| Catalyst No. | Inlet | NH$_3$ decomposition catalyst outlet | Mercury oxidation catalyst outlet |
| --- | --- | --- | --- |
| ToHg concentration (μg/m$^3$N) | 30 | 30 | 30 |
| HgCl$_2$ concentration (μg/m$^3$N) | 0.5 | 5.2 | 28.8 |
| HCl concentration (ppm) | 10 | — | — |
| NH$_3$ concentration (ppm) | 10 | <0.1 | <0.1 |
| NH$_3$ decomposition rate (%) | — | >99.9 | — |
| Hg oxidation rate (%) | — | 15.9 | 95.2 |

From the test results given in Table 2, it was found that by decomposing 99% or more of ammonia by the NH$_3$ decomposition catalyst, even if the temperature of the mercury oxidation catalyst is as low as 160° C., 95% or more of metallic mercury in the gas can be oxidized, and can be removed by the downstream wet type desulfurization apparatus.

By this example, it was made clear that in the above-described embodiment, when the mercury oxidation catalyst 10 is installed in a temperature zone of 60 to 200° C. (10b, 10c) on the downstream side of the heating process using the air heater 4 etc., mercury oxidation reaction proceeds sufficiently.

The above is a description of the embodiment and examples of the present invention. These embodiment and examples are provided to make the understanding of the present invention easy, and do not limit the claims of the present invention.

The invention claimed is:

1. A method for removing mercury in exhaust gas, in which mercury is removed from exhaust gas of a boiler, characterized in that
said mercury removing method comprises an NH$_3$ decomposition process for decomposing excess NH$_3$ flowing down from a denitrification process and a mercury oxidation process for oxidizing mercury into mercury chloride on the downstream side of said NH$_3$ decomposition process, which are provided between said denitrification process and a wet desulfurization process, and mercury having been oxidized into mercury chloride is removed in said wet desulfurization process, said NH$_3$ decomposition process is separate from said denitrification process.

2. The method for removing mercury in exhaust gas according to claim 1, characterized in that
in the mercury removing method comprising a heating process and a heat recovery process, which are provided between said denitrification process and wet desulfurization process,
said NH$_3$ decomposition process is carried out in a temperature zone of 300 to 450° C. on the downstream side of said denitrification process, and
said mercury oxidation process is carried out at least in one location of a temperature zone of 300 to 450°C. on the downstream side of said NH$_3$ decomposition process, a temperature zone of 120 to 200° C. on the downstream side of said heating process, or a temperature zone of 60 to 120° C. on the downstream side of said heat recovery process.

3. The method for removing mercury in exhaust gas according to claim 1, characterized in that when said mercury oxidation process is carried out on the downstream side of said heating process, the temperature is controlled to a predetermined temperature in the range of 60 to 200° C.

4. The method for removing mercury in exhaust gas according to claim 1 or 2, characterized in that the temperature in said mercury oxidation process is controlled by measuring the concentration of metallic mercury or mercury chloride in an oxidation catalyst outlet gas in said mercury oxidation process.

5. The method for removing mercury in exhaust gas according to claim 1 or 2, characterized in that in said NH$_3$ decomposition process, NH$_3$ is treated so that the concentration of NH$_3$ at the outlet is 1 ppm or lower, and then mercury is oxidized in said mercury oxidation process.

6. The method for removing mercury in exhaust gas according to claims 1 or 2, further comprising a NH$_3$ decomposition catalyst, said NH$_3$ decomposition catalyst comprises a carrier and an active component, said carrier is selected from the group consisting of TiO$_2$, SiO$_2$, ZrO$_2$, Al$_2$O$_3$, and zeolite, and said active component is selected from the group consisting of Pt, Ru, Rh, Pd, Ir, V, W, Mo, Ni, Co, Fe, Cr, Cu, and Mn.

7. The method for removing mercury in exhaust gas according to claims 1 or 2, further comprising a mercury oxidation catalyst, said mercury oxidation catalyst comprising a carrier and an active component, said carrier is selected from the group consisting of TiO$_2$, SiO$_2$, ZrO$_2$, Al$_2$O$_3$, and zeolite, and said active component is selected from the group consisting of Pt, Ru, Rh, Pd, Ir, V, W, Mo, Ni, Co, Fe, Cr, Cu, and Mn.

8. A method for removing mercury in exhaust gas, in which mercury is removed from exhaust gas of a boiler, characterized in that
said mercury removing method comprises a NH$_3$ decomposition process for decomposing excess NH$_3$ flowing down from a denitrification process and a mercury oxidation process for oxidizing mercury into mercury chloride on the downstream side of said NH$_3$ decomposition process, which are provided between said denitrification process and a wet desulfurization process, and mercury having been oxidized into mercury chloride is removed in said wet desulfurization process, said NH$_3$ decomposition process is separate from said denitrification process, and
wherein said NH$_3$ decomposition occurs over a catalyst comprising a carrier and an active component, said carrier is selected from the group consisting of TiO$_2$, SiO$_2$, ZrO$_2$, Al$_2$O$_3$, and zeolite, and said active component is selected from the group consisting of Pt, Ru, Rh, Pd, Ir, V, W, Mo, Ni, Co, Fe, Cr, Cu, and Mn.

9. The method for removing mercury in exhaust gas according to claim 8, further comprising a mercury oxidation catalyst, said mercury oxidation catalyst comprising a carrier and an active component, said carrier is selected from the group consisting of TiO2, SiO2, ZrO2, Al2O3, and zeolite, and said active component is selected from the group consisting of Pt, Ru, Rh, Pd, Ir, V, W, Mo, Ni, Co, Fe, Cr, Cu, and Mn.

10. A method for removing mercury in exhaust gas, in which mercury is removed from exhaust gas of a boiler, characterized in that
said mercury removing method comprises an NH$_3$ decomposition process for decomposing excess NH$_3$ flowing down from a denitrification process and a mercury oxidation process for oxidizing mercury into mercury chloride on the downstream side of said $NH_3$ decomposition process, which are provided between said denitrification process and a wet desulfurization process, and mercury having been oxidized into mercury chloride is removed in said wet desulfurization process, said $NH_3$ decomposition process is separate from said denitrification process, wherein said mercury oxidation occurs over a catalyst comprising a carrier and an active component, said carrier is selected from the group consisting of $TiO_2$, $SiO_2$, $ZrO_2$, $Al_2O_3$, and zeolite, and said active component is selected from the group consisting of Pt, Ru, Rh, Pd, Ir, V, W, Mo, Ni, Co, Fe, Cr, Cu, and Mn.

11. The method for removing mercury in exhaust gas according to claim 10, further comprising a $NH_3$ decomposition catalyst, said $NH_3$ decomposition catalyst comprises a carrier and an active component, said carrier is selected from the group consisting of $TiO_2$, $SiO_2$, $ZrO_2$, $Al_2O_3$, and zeolite, and said active component is selected from the group consisting of Pt, Ru, Rh, Pd, Ir, V, W, Mo, Ni, Co, Fe, Cr, Cu, and Mn.

* * * * *